United States Patent Office 3,285,970
Patented Nov. 15, 1966

3,285,970
SYNTHESIS OF ACETALS
William D. Schaeffer, Pomona, Calif., assignor to Union Oil Company of California, Los Angeles, Calif., a corporation of California
No Drawing. Filed June 18, 1963, Ser. No. 288,634
8 Claims. (Cl. 260—615)

This invention relates to the oxidation of olefins to acetals useful as solvents, or as intermediates in the preparation of unsaturated ethers and in particular relates to the oxidation of ethylene to acetals.

The process of this invention comprises the oxidation of ethylene in an organic solvent comprising an alcohol and catalytic amounts of a platinum group metal with optional redox agents. In specific embodiments, this invention relates to the production of dimethyl acetal and diethyl acetal.

While it has been recognized by the art that acetals can be prepared by reaction of ethylene with alcoholic solutions of a platinum group metal, e.g., see Doklady Akad. Nauk, vol. 32, page 377 (1960), heretofore this reaction has remained a laboratory curiosity as no feasible method for the continuous production of acetals has been devised. In particular, the preparation of acetals by contacting ethylene with alcoholic solutions of platinum group metals results in reduction of a stoichiometric amount of the ions of the dissolved platinum group metal to the free metal.

The usefulness of the solution can be extended somewhat by incorporating in the solution various redox agents that will oxidize the platinum metal to the ion such as benzoquinone that is reduced in the reaction to hydroquinone. This approach is not commercially feasible because hydroquinone can not readily be oxidized in the solution to benzoquinone for reuse. While it is possible to use inorganic salts as redox agents, this approach is also not commercially attractive because of the limited solubility of such redox agents in the alcoholic solvent, necessitating high catalyst circulation rates between the reactor and a separate oxidation unit.

I have attempted to synthesize acetals by the concurrent introduction of oxygen into alcoholic solutions of platinum metals and have found that with or without the aforementioned redox agents there occurs a very slow rate of oxidation with extensive side reactions, involving oxidation of the solvent and oxidation of the olefin to products other than acetals.

I have now found, however, the reaction can be made to proceed rapidly with simultaneous oxidation of the reduced free metal to achieve high yields of acetals when the alcoholic medium is acidified with a strong mineral acid. This discovery was quite surprising in view of the art's knowledge that the presence of water in this type of oxidation favors the oxidation of ethylene to acetaldehyde at a very high rate, particularly in an acidic medium. Accordingly, it was generally believed that simultaneous oxidation of the precipitated platinum group metal to the dissolved ions would result in production of substantially all acetaldehyde. Contrary to such expectations, however, I have discovered that the water generated during reoxidation of the platinum group metal does not preclude the synthesis of acetals in acidic alcoholic solutions, but rather, acetals can be obtained as the major product of the oxidation.

The single step synthesis of acetals acording to my invention comprises introducing an olefin, preferably ethylene and an oxygen containing gas into contact with an alcoholic reaction medium containing a platinum metal, preferably palladium, an acid and halogen ions. A strong mineral acid is added in an amount between about 0.1 and about 5 weight percent; preferably between about 0.2 and about 3 weight percent; to the reaction medium to permit the simultaneous oxidation and synthesis of acetals. Strong mineral acids can be used such as sulfuric, phosphoric, and halogen acids, e.g., hydrogen chloride or hydrogen bromide. Of these, the halogen acids are preferred and of the halogen acids, hydrogen chloride is most preferred. When halogen acids are employed, these acids also serve as a source of the aforementioned halogen ions in the solution.

The remainder of the catalyst solution comprises the platinum group metal and a halogen, i.e., bromide or chlorine containing compound. The platinum metal can be of the platinum sub-group, i.e., platinum, rhenium or iridium or the palladium sub-group, i.e., palladium, rhodium or ruthenium. Of the aforementioned, I prefer palladium because of its much greater activity. In general, the platinum group metal can be employed in amounts between about 0.001 and 5.0 weight percent of the liquid reaction medium. In general, however, concentrations between about 0.04 and about 0.3 weight percent are preferred. The platinum group metal can be added to the alcoholic reaction medium as a finely divided metal, as a soluble salt, or as a chelate. Examples of suitable salts are the halides such as palladium chloride, rhodium bromide, ruthinium chloride, osmium oxide, iridium chloride and palladium chloride. Examples of suitable chelates are palladium acetylacetonate and complexes of platinum group metal ions with such conventional chelating agents as ethylene diamine tetraacetic acid, citric acid, etc.

The catalyst solution should also contain halogen ions or bromine or chlorine containing compounds that liberate the ions during oxidation. When a halogen acid is added, as aforementioned, it serves as a source of some of the necessary halogen; the remainder of the necessary halogen is provided by any of the following sources of available halogen ions. The halogen can be added as elemental chlorine or bromine; however, it is preferred to employ less volatile halogen compounds such as alkali metal halides, e.g., sodium chloride, lithium bromide, cesium chloride, potassium bromide, sodium bromate, lithium chlorate; ammonium halides, ammonium bromide, ammonium chloride; or any of the aforementioned platinum group metal bromides or chlorides. Various organic compounds that liberate hydrogen halide or halogen under the reaction conditions can be used such as aliphatic chlorides or bromides, e.g., ethyl bromide, propyl chloride, butyl chloride, benzyl bromide, phosgene, etc. In general, sufficient of the aforementioned halogen containing compounds should be added to provide a total of available halogen ions in an amount between about 0.05 and about 5.0 weight percent, calculated as the halogen, in the reaction zone; preferably concentrations between about 0.1 and about 3.0 weight percent are employed.

While the reaction medium should comprise an alcohol, the presence of other organic solvents that are inert under the oxidation conditions is not precluded. Examples of various organic liquids that can also be present in amounts between about 0 to about 90 percent of the reaction medium include formamide, dimethyl formamide, chlorobenzene, dichlorobenzene, aliphatic hydrocarbons such as hexane, decane, dodecane, etc.; toluene; etc.

The remainder of the reaction medium comprises the desired alcohol. Since the alkoxy group of the acetal product is derived from the alcohol reactant and reaction solvent employed in the oxidation zone, the remainder of the reaction medium should comprise the desired alcohol. In general, aliphatic alcohols having between 1 and about 10 carbon atoms can be employed in the reaction such as methanol, ethanol, propanol, isopropanol butanol, isobutanol, pentanol, isopentanol, hexanol, isohexanol, cyclohexanol, heptanol, isoheptanol, octanol, isooctanol, decanol, isodecanol, etc. In general, primary and secondary alcohols are employed and preferred for the reaction. Of the aforementioned, the primary and secondary aliphatic alcohols having from 1 to about 5 carbon atoms are preferred. Mixtures of various alcohols can also be employed as desired.

Various redox compounds can optionally be used. Typical of such are the soluble salts of multivalent metal ions such as the acetates, bromides or chlorides of copper, iron, thallium, manganese, cobalt, silver, mercury, nickel, cerium, titanium, uranium, bismuth, tantalum, tin, lead, chromium, molybdenum, vanadium or antimony. Of these, cupric and ferric salts are preferred and cupric salts are most preferred for their solubility and desirable effect on the rate of oxidation. In general, the redox compound can be added to the reaction medium to provide a concentration between about 0.1 and about 8 weight percent; preferably from about 0.5 to about 5.0 weight percent calculated as the metal.

Various nitrogen oxides also function as redox agents in the reaction, however, these agents are not as preferred. If desired, however, between about 0.01 and about 3.0 weight percent of the reaction medium; preferably between about 0.1 and about 1.0 weight percent; calculated as nitrogen dioxide; can comprise the nitrogen oxide that is added as a nitrate or nitrite salt or as nitrogen oxides.

The nitrogen oxides can be added to the reaction medium in various forms, e.g., nitrogen oxide vapors such as nitric oxide, nitrogen dioxide, nitrogen tetraoxide, etc., can be introduced into the reaction medium or soluble nitrate or nitrite salts such as sodium nitrate, lithium nitrate, lithium nitrite, potassium nitrate, cesium nitrate, etc. can be added to the reaction medium.

The oxidation is performed by introducing oxygen or a free oxygen containing gas such as air or mixtures of air with oxygen or inert diluents such as nitrogen together with ethylene into contact with the catalyst at temperatures between about 30° and about 300° C.; 100° to about 170° C. being preferred.

The reaction pressures employed are sufficient to maintain liquid phase conditions and from about atmospheric to about 100 atmospheres or more can be employed. Preferably, however, elevated pressures are employed to favor a rapid oxidation rate, e.g., from about 10 to about 75 atmospheres and most preferably, from about 40 to about 75 atmospheres are used. In general, high ethylene partial pressures result in maximum rates of oxidation and accordingly, a hydrocarbon stream rich in ethylene is preferred for the oxidation. If desired, however, the oxidation can be performed on various hydrocarbon gas streams containing at least about 20 volume percent ethylene such as the refinery ethane-ethylene gas streams.

Under the aforedescribed conditions, ethylene is rapidly oxidized to acetal as the major product with acetaldehyde as the major by-product. Other by-products also formed include carbon dioxide and small quantities of alkyl esters. In general, the liquid catalyst solution is supplied and recycled to the reaction zone at maximum rates to prevent the accumulation of substantial amounts of water that would otherwise favor the production of a high yield of acetaldehyde.

The following examples will illustrate the results obtainable when practicing my invention;

*Example 1*

To a 1-gallon autoclave was added 600 grams methyl alcohol, containing 1.0 gram palladium chloride, 12.0 grams cupric chloride and 5 milliliters concentrated hydrochloric acid. The autoclave was pressured to 350 p.s.i.g. with ethylene closed and heated to 260° F. Nitrogen was admitted to a pressure of 850 p.s.i.g. and thereafter oxygen was admitted at 20 p.s.i.g. increments. Upon addition of oxygen, a rapid reaction was observed and after 20 minutes the oxidation was terminated, the autoclave cooled and its contents emptied and neutralized with potassium hydroxide. The crude product, which contained about 2.2 weight percent water, was then distilled to recover the following yields of products;

| Products: | Yields (mol percent) |
|---|---|
| Butenes | 3.9 |
| Dimethyl ether | 1.8 |
| Methyl vinyl ether | 1.7 |
| Acetaldehyde | 13.9 |
| Methylol | 4.0 |
| Dimethyl acetal | 70.4 |
| Methyl acetate | 2.9 |
| Methyl formate | 2.3 |

*Example 2*

To a 1-gallon autoclave was added 550 grams of absolute ethanol, 1.0 gram palladium chloride, 8.0 grams cupric chloride and 10 milliliters of concentrated hydrochloric acid. The autoclave was pressured to 500 p.s.i.g. with ethylene, heated to 300° F. and then pressured to 900 p.s.i.g. with nitrogen. An incremental 20 p.s.i.g. of oxygen was added and the reaction observed to proceed very smoothly with addition of oxygen during a 20 minute period. The autoclave was thereafter cooled, emptied and the reaction mixture neutralized at 0° C. with potassium hydroxide. The crude product was then distilled and the following yield of products was obtained.

| Products: | Yields (mol percent) |
|---|---|
| Butenes | 10.9 |
| Methyl acetate | 1.1 |
| Ethyl acetate | 3.0 |
| Acetaldehyde | 34.9 |
| Acrolein | 4.0 |
| Acetal | 45.9 |

The preceeding data demonstrate that a high yield of acetals can be readily obtained by the oxidation of ethylene under these conditions. Although a relatively high yield of by-products was obtained, the amount of these materials can be reduced substantially by operating under less severe conditions, i.e., lower temperature and less free acid.

When the reaction is repeated with butanol, decanol and other aliphatic primary and secondary alcohols, substantially the same rates of oxidation are observed and comparable yields of the acetals are obtained.

While the preceding description has been directed to the oxidation of ethylene to acetals, it is of course apparent that other low molecular weight olefins having up to about 5 carbons can also be oxidized to acetals such as propylene, butene-1, propene-1, etc. Additionally mixed streams of olefins and saturates such as commonly available in petroleum refineries can be used, e.g., a mixed ethylene-ethane stream containing from 5 to 75 volume percent ethane can, nevertheless, serve as a raw material feed to the oxidation.

The preceding examples are intended solely to illustrate my invention and demonstrate the yields of acetals obtained therewith. These examples are not intended to unduly limit the scope of my invention that is defined by the method steps and their equivalents set forth in the following claims.

Having completely disclosed and illustrated my invention I therefore claim:

1. The synthesis of acetals by the oxidation of a 1-olefin having 2 to about 5 carbon atoms that comprises contacting said olefin and an oxygen containing gas with a substantially anhydrous organic reaction medium comprising an alkanol having from 1 to about 10 carbons containing a catalytic amount of a member selected from the group consisting of platinum group metals and chloride and bromide salts thereof, between about 0.1 and about 5.0 weight percent of a strong mineral acid selected from the class consisting of sulfuric, phosphoric, hydrochloric and hydrobromic acids and mixtures thereof, and between about 0.05 and about 5.0 weight percent of halogen available as halide ions, said halogen selected from the class consisting of chlorine and bromine, said contacting being at temperatures between about 30° and about 300° centigrade and pressures between about 1 and about 100 atmospheres.

2. The synthesis of claim 1 wherein said olefin is ethylene.

3. The synthesis of claim 1 wherein said alcohol is methanol.

4. The synthesis of acetals from ethylene that comprises contacting a hydrocarbon gas comprising ethylene and an oxygen containing gas at a temperature between about 100° and about 170° centigrade and at a pressure between about 10 and about 75 atmospheres with an alcoholic reaction medium comprising an alkanol having from 1 to about 5 carbon atoms and containing between about 0.04 and about 0.3 weight percent of a catalyst selected from the group consisting of palladium and chloride and bromide salts thereof, between about 0.5 and about 5.0 weight percent of a redox agent selected from the class consisting of cupric and ferric, chloride, bromide and acetate salts, between about 0.2 and about 3.0 weight percent of a strong mineral acid selected from the class consisting of sulfuric, phosphoric, hydrochloric and hydrobromic acid and between about 0.05 and about 5.0 weight percent of halogen available as halide ions, said halogen selected from the class consisting of chlorine and bromine.

5. The synthesis of claim 4 wherein said alcohol is methanol.

6. The synthesis of claim 4 wherein said alcohol is ethanol.

7. The oxidation of claim 1 wherein said reaction medium also contains from about 0.1 to about 8 weight percent of a redox agent selected from the class consisting of cupric and ferric chloride, bromide and acetate salts.

8. The oxidation of claim 1 wherein the reaction medium also contains between about 0.01 and about 3.0 weight percent of a nitrogen oxide salt selected from the class consisting of alkali metal nitrates and nitrites.

References Cited by the Examiner

FOREIGN PATENTS 628,848  6/1963  Belgium.
137,508  4/1960  U.S.S.R.

OTHER REFERENCES

Moiseev et al.: "Proceedings of the Academy of Sciences," vol. 133, No. 1–6, July–August 1960, 801–804, Translated from Doklady Akademii Nauk, U.S.S.R., vol. 133, No. 2, pp. 377–380, July 1960.

Moiseev et al.: Proce. Acad. Sciences, U.S.S.R., Physical Chem. Sect., 1960, pp. 115–118 (Translation of Doklady Akademii Nauk, U.S.S.R., vol. 130, 1960, pp. 820–823.

LEON ZITVER, *Primary Examiner.*

H. T. MARS, *Assistant Examiner.*